United States Patent
Hinchliffe et al.

(10) Patent No.: US 7,310,817 B2
(45) Date of Patent: Dec. 18, 2007

(54) CENTRALLY MANAGED MALWARE SCANNING

(75) Inventors: Alex James Hinchliffe, Milton Keynes (GB); Fraser Peter Howard, Chipping Norton (GB); Andrew Kemp, Oxford (GB); Bobby Rai, Kettering (GB)

(73) Assignee: McAfee, Inc., Santa Clara, CA (US)

( * ) Notice: Subject to any disclaimer, the term of this patent is extended or adjusted under 35 U.S.C. 154(b) by 1060 days.

(21) Appl. No.: 09/912,392

(22) Filed: Jul. 26, 2001

(65) Prior Publication Data
US 2003/0023866 A1   Jan. 30, 2003

(51) Int. Cl.
G06F 21/22 (2006.01)
G06F 11/30 (2006.01)
G06F 15/173 (2006.01)
G06F 21/24 (2006.01)

(52) U.S. Cl. .................. 726/24; 713/188; 713/187; 709/223; 709/224

(58) Field of Classification Search ........ 713/200–201, 713/188, 187, 181, 176; 709/23–224; 726/24
See application file for complete search history.

(56) References Cited

U.S. PATENT DOCUMENTS

| | | | | |
|---|---|---|---|---|
| 4,933,969 A * | 6/1990 | Marshall et al. | ............. | 713/177 |
| 5,958,051 A * | 9/1999 | Renaud et al. | ................. | 726/22 |
| 5,960,170 A * | 9/1999 | Chen et al. | .................... | 714/38 |
| 6,021,510 A * | 2/2000 | Nachenberg | ................. | 714/38 |
| 6,195,587 B1 * | 2/2001 | Hruska et al. | ................. | 700/2 |
| 6,598,060 B2 * | 7/2003 | Goldick | ....................... | 707/203 |
| 6,611,925 B1 * | 8/2003 | Spear | ........................... | 714/38 |
| 6,748,538 B1 * | 6/2004 | Chan et al. | .................. | 713/200 |
| 6,892,303 B2 * | 5/2005 | Le Pennec et al. | ......... | 713/188 |
| 6,922,782 B1 * | 7/2005 | Spyker et al. | .............. | 713/161 |
| 6,976,271 B1 * | 12/2005 | Le Pennec et al. | ........... | 726/24 |
| 6,986,051 B2 * | 1/2006 | Le Pennec et al. | ......... | 713/188 |
| 7,032,114 B1 * | 4/2006 | Moran | ........................ | 713/187 |
| 7,058,978 B2 * | 6/2006 | Feuerstein et al. | ............ | 726/26 |
| 2001/0005889 A1 * | 6/2001 | Albrecht | ..................... | 713/201 |
| 2002/0099952 A1 * | 7/2002 | Lambert et al. | ............ | 713/200 |
| 2002/0103783 A1 * | 8/2002 | Muhlestein | .................... | 707/1 |
| 2002/0112163 A1 * | 8/2002 | Ireton | ......................... | 713/176 |
| 2002/0129277 A1 * | 9/2002 | Caccavale | ................... | 713/201 |

FOREIGN PATENT DOCUMENTS

EP   1 111 507   6/2001

OTHER PUBLICATIONS

Trend Micro, "Ensuring Data Integrity with Trend Micro Serverprotect for Network Appliance Filers", 2001 Trend Micro, Inc. pp. 1-12.*
R. Marmelstein et al, "A Distributed Architecture for an Adaptive Computer Virus Immune System" IEEE International Conference, San Diego, CA Oct. 1998, pp. 3838-3843.

* cited by examiner

*Primary Examiner*—Ayaz Sheikh
*Assistant Examiner*—Matthew T Henning
(74) *Attorney, Agent, or Firm*—Zilka-Kotab, PC; Christopher J. Hamaty

(57) ABSTRACT

A malware detecting system is described in which a client computer 8 sends a file access clearance request to an assessment computer 24 to determine whether or not access is permitted to that file. In this way, the different client computers on a network 2 may share their scan results and centralized control may be provided over access permissions to individual files or groups of files.

59 Claims, 5 Drawing Sheets

| FILENAME | ORIGINATOR | PATH | CHECKSUM | ACCESS ALLOWED | PERSISTENT |
|---|---|---|---|---|---|
| . | . | . | . | . | . |
| . | . | . | . | . | . |
| . | . | . | . | . | . |
| WINWORD.EXE | CLIENT N | C:\PROGRAM FILES\MICROSOFT OFFICE\OFFICE | [12345678] | Y | Y |
| . | . | . | . | . | . |
| . | . | . | . | . | . |
| . | . | . | . | . | . |

FIG. 5

CENTRALLY MANAGED MALWARE SCANNING

BACKGROUND OF THE INVENTION

Field of the Invention

This invention relates to the field of data processing systems. More particularly, this invention relates to the field of malware scanning, such as, for example, scanning for computer viruses, Trojans, worms, banned computer files or E-mails containing banned words or content.

BACKGROUND OF THE INVENTION

It is known to provide malware scanning systems and mechanisms for identifying malware within a computer file to be accessed. As the number of computer viruses and the like that are present in the wild increases the processing associated with scanning a computer file to identify the presence of any of those viruses similarly increases. This increase in the processing required is disadvantageous. Furthermore, with the increasing levels of network connectivity between computer systems and the use of E-mail and other fast messaging systems, the spread of computer viruses has become increasingly rapid. In a number of recent cases mass mailing viruses have spread at such a speed that considerable damage has been caused before appropriate countermeasures have been able to be put in place. The delay in deploying such countermeasures is further increased by the need in many cases to update virus definition data on every individual node computer to be protected. The speed of spread of recent viruses is such that the download and installation delays associated with installing such new countermeasures, even when they have been developed and are available, is a significant disadvantage.

An anti-virus system produced by Sophos uses a locally held record of previously conducted on-access scans on the individual computer in question to determine whether or not a scan should be conducted for a computer file or a previously determined result used instead when this is available.

SUMMARY OF THE INVENTION

Viewed from one aspect the present invention provides a computer program product for controlling a computer to detect malware, said computer program product comprising:

detecting logic operable to detect a file access request to a computer file by a requesting computer;

file access clearance request generating logic operable to generate a file access clearance request including data identifying said computer file;

file access clearance request transmitting logic operable to transmit said file access clearance request from said requesting computer to an assessment computer responsible for assessment of whether said computer file contains malware;

file access clearance response receiving logic operable to receive at said requesting computer a file access clearance response from said assessment computer; and file access permitting logic operable if said file access clearance response indicates said computer file does not contain malware, to permit said file access request by said requesting computer.

The invention recognises that an individual computer requiring a file access may pass the task of determining whether or not that access should be allowed to a different assessment computer. Whilst at first sight this may seem that it would slow down the file access, in practice there are considerable advantages. For example, the assessment computer to which the task is passed may be more rapidly updated with new virus definition data as this is released than would be possible for the requesting computer. Accordingly, the requesting computer can benefit from the most up-to-date virus definition data more rapidly. Furthermore, the invention is particularly well suited to systems in which a plurality of requesting computers share an assessment computer since in many cases the individual requesting computers will show a high degree of correlation in the computer files to which they are requesting access and for which a malware scan is needed. Thus, rather than each requesting computer individually scanning the computer files that are also being scanned by a large number of other computers, (e.g. the computer files associated with the operating system shared by all the requesting computers), these computer files can instead be scanned once by the assessment computer and then each requesting computer can check that the computer file has been scanned and cleared by sending an appropriate request to the assessment computer rather than having to scan the file itself. Thus, in exchange for the use of a small amount of bandwidth on the connections between the requesting computers and the assessment computer, a considerable processing burden may be lifted from the requesting computers. The additional processing burden on the assessment computer does not increase disproportionately since the high degree of correlation between the computer files accessed by the different requesting computers means that in many cases the assessment computer will be able to respond to a clearance request from a requesting computer on the basis that it has already scanned that file and without the need to rescan that file.

In order to identify the computer file to be scanned in a secure manner to the assessment computer, the data identifying the computer file preferably includes a checksum value. Checksum values may be made sufficiently specific for a computer file from which they have been calculated so as to be difficult to bypass as a way of uniquely identifying a computer file.

Additional data that is highly useful to the assessment computer in managing the requests it receives includes the filename of the computer file, data identifying the requesting computer and the storage location of the computer file. This provides useful audit information as well as providing for the possibility of files having the same name and same storage location on different computers in fact being different files with different checksums, both of which should be treated as separate entities when determining whether or not a request from another requesting computer relates to a file that has already scanned.

In circumstances when a requesting computer wishes to access a file that has not already been scanned, the assessment computer may send a scan request message back to the requesting computer such that the requesting computer may send a copy of the file to the assessment computer for scanning. It will be appreciated that this may be slower than scanning the file locally, but the benefit will be that should a different requesting computer later wish to access that same file, then the scanning result produced by this action can be shared with that other computer, so speeding the operation of that other computer.

If the assessment computer determines that access should be denied to a computer file, then this may be used to trigger denied access actions within the requesting computer, the assessment computer, or elsewhere. Such denied access actions may include deletion of the computer file, repair of the computer file, quarantining of the computer file, generation of user warning messages, generation of administrator warning messages and the like.

Viewed from another aspect the invention also provides a computer program product for controlling a computer to detect malware, said computer program product comprising:

file access request receiving logic operable to receive at an assessment computer a file access clearance request from a requesting computer, said file access clearance request including data identifying a computer file to be accessed by said requesting computer;

file access clearance response generating logic operable in dependence upon said data identifying said computer file to determine if said computer file has previously been assessed as not containing malware and to generate a file access clearance response; and file access clearance response transmitting logic operable to transmit said file access clearance response to said requesting computer.

The assessment computer may advantageously store the results of its previous scans within a database. This database may include a variety of fields relating to each computer file that has been scanned. These fields may include an access flag indicating whether access is to be denied to that computer file and a persistence flag indicating whether or not the entry for that computer file should be purged during purge operations.

The access flag is particularly useful as in addition to allowing the recording that access should be denied due to malware being detected, it also allows the central management of whether or not a particular individual file or class or type of file should be permitted to be accessed by all of those requesting computers that seek their access permissions from that assessment computer. This centralised control is a powerful tool that may be used to implement techniques such as the triggering of a lock down mode of operation in which higher level security provisions are put in place by denying access to certain files or types of files. As an example, if a message was received indicating that the higher security mode should be entered, then the assessment computer may use its mechanisms to deny access to any newly encountered computer file that had not previously been scanned and cleared for use. This would typically allow the large majority of computer activity to continue whilst providing protection against newly released malware threats until the appropriate countermeasures could be put in place.

The persistence flag allows control of the flushing of entries from the assessment computer. Whilst one of the advantages of the invention is storing the results of previously conducted scans such that they need not be repeated, this has to be tempered by allowing the results to be refreshed at a later time for at least some files. It is possible to envisage that a particular computer file carrying a newly released virus may not be detected as carrying that virus when it is first scanned, but later when a new virus driver is available, that computer file would be detected and blocked. Accordingly, as an example, it may be that all previous scan results could be purged from the system whenever the virus definition data was updated.

Viewed from a further aspect the invention provides a computer program product for controlling a computer to detect malware, said computer program product comprising:

file access request detecting logic operable to detect a file access request to a computer file by a requesting computer;

file access clearance request generating logic operable to generate a file access clearance request including data identifying said computer file;

file access clearance request transmitting logic operable to transmit said file access clearance request from said requesting computer to an assessment computer responsible for assessment of whether said computer file contains malware;

file access clearance request receiving logic operable to receive at said assessment computer said file access clearance request from a requesting computer, file access clearance response generating logic operable in dependence upon said data identifying said computer file to determine if said computer file has previously been assessed as not containing malware and to generate a file access clearance response;

file access clearance response transmitting logic operable to transmit said file access clearance response to said requesting computer;

file access clearance response receiving logic operable to receive at said requesting computer said file access clearance response from said assessment computer; and file access permitting logic operable if said file access clearance response indicates said computer file does not contain malware to permit said file access request by said requesting computer.

As well as the complementary aspects of the invention embodied in the form of the client software, the server software and the combination of the client and server software, the invention may also take the form of corresponding methods of malware detection and apparatus for malware detection.

The above, and other objects, features and advantages of this invention will be apparent from the following detailed description of illustrative embodiments which is to be read in connection with the accompanying drawings.

BRIEF DESCRIPTION OF THE DRAWINGS

FIG. 5 schematically illustrates a database entry relating to a computer file that has previously been scanned.

DESCRIPTION OF THE PREFERRED EMBODIMENTS

Figure 1:
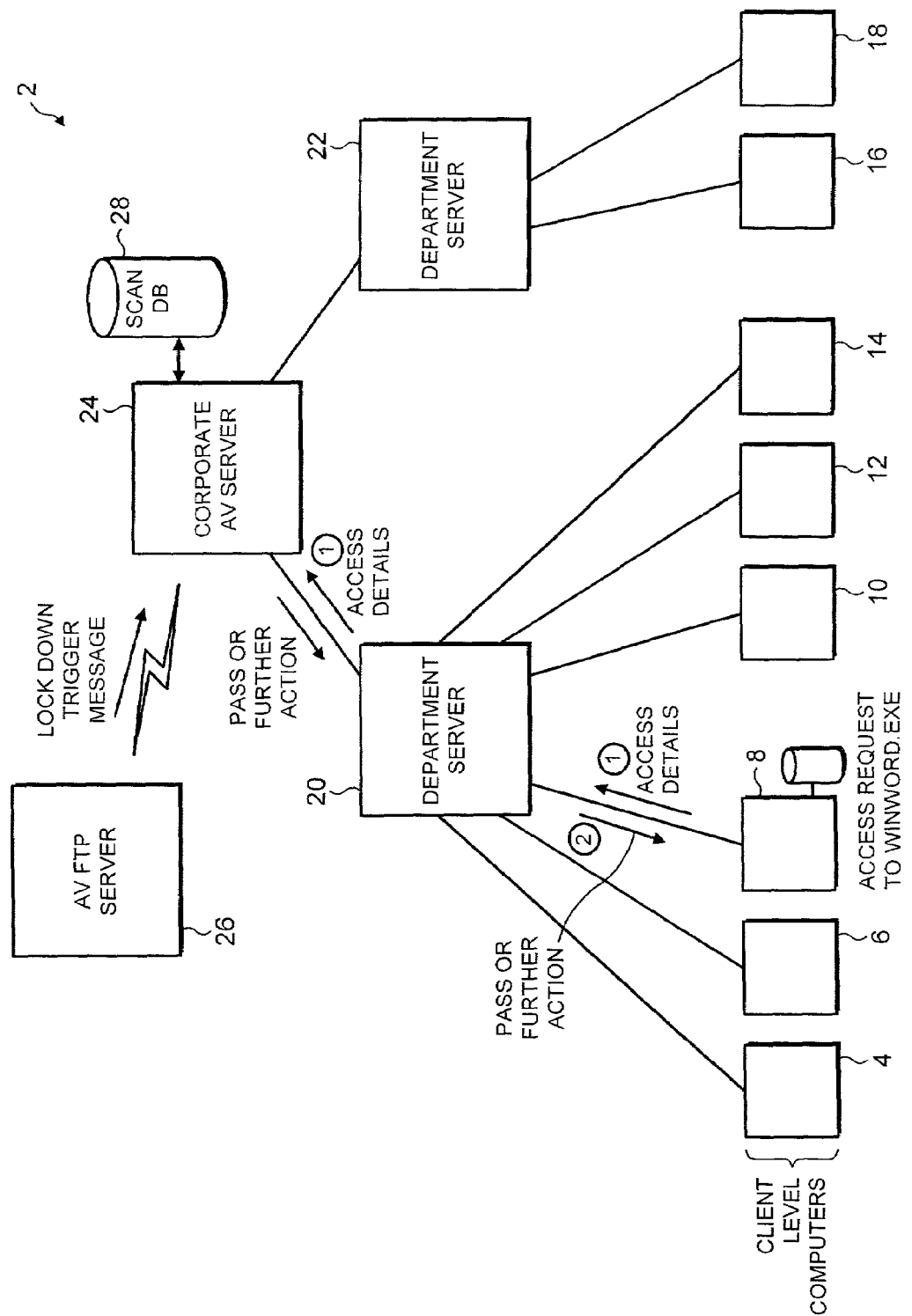
FIG. 1 schematically illustrates a computer network to which the present technique may be applied.

FIG. 1 schematically illustrates a computer network 2 comprising a plurality of client computers 4, 6, 8, 10, 12, 14, 16, 18 connected to respective departmental servers 20, 22 and to a corporate anti-virus (assessment) server 24. The computer network 2 is also connected via a network link to an anti-virus providers FTP server 26 from which virus definition data may be downloaded and from which messages, such as lock down messages or messages relating to the availability of new virus definition data may be received.

In operation a client computer 8 conducts processing activity during which it seeks to make a file access to a particular computer file (in this example, winword.exe). Rather than scanning this file itself for malware such as computer viruses, Trojans, worms, banned content etc, the client computer 8 instead passes an access clearance request relating to the computer file through to the assessment computer 24 via the departmental server 20. The access clearance request includes the file name of the computer file being accessed, a checksum derived from that file in an effort to uniquely identify it (e.g. an MD5 checksum), data identifying the name of the client computer 8, and the path used by that client computer 8 to access the computer file. The assessment computer 24 receives the access clearance request and uses the data identifying the computer file to look up within an associated database 28 as to whether or not a malware scan has already been conducted for that particular computer file. The computer file is uniquely identified by its filename and checksum value. If the computer file in question has already been scanned, then the result of that scan may be reused rather than conducting the scan again. The assessment computer 24 can accordingly pass back to the client computer 8 a clearance request response indicating whether or not access to that file is permitted or some other further action should be taken. The client computer 8 can then use this access clearance response to either permit access to the file or take the further action specified.

The further action specified could be that the computer file has already been identified as containing malware and accordingly an appropriate anti-virus or other anti-malware response should be initiated on the client computer 8. A corresponding response could already have been initiated on the assessment computer 24. The denied access responses could take the form of deleting the computer file concerned, repairing the computer file concerned, quarantining the computer file concerned, issuing a user alerting message, issuing an administrator alerting message, issuing a message to an anti-virus provider or some other action.

A different type of further action that could be required by the client computer 8 in response to the access clearance response arises when the assessment computer 24 has not previously scanned that file and accordingly the client computer 8 should send a copy of that file through to the assessment computer 24 to be scanned. When such a copy of the computer file has been sent through to the assessment computer 24 and scanned, an appropriate pass or denied access action triggering response can be sent back from the assessment computer 24 to the client computer 8.

It will be appreciated that the client computers 4, 6, 8, 10, 12, 14, 16, 18 operate to share the results of the malware scanning that is performed on their behalf by the assessment computer 24. Since there is likely to be a high degree of correlation between the files being accessed by the different client computers, in many cases the scan that a client computer is requesting will already have been performed on behalf of another computer and that scan need not be run again by the assessment computer but instead merely the result of the previous scan returned. The use of a checksum allows the computer files to be reliably uniquely identified.

The co-ordination of file access permissions by the assessment computer 24 also allows central management of which computer files may be accessed upon the network 2 in a manner that allows the rapid implementation of any higher security level mode should this be desired. As an example, a lock down trigger message may be received from the anti-virus provider FTP server 26 that will trigger the assessment computer 24 to enter a higher security level mode compared to its normal mode of operation. In the higher security level mode, it may be that the access to whole variety of different types of files may be temporarily banned. As an example, the access to VBS files which are often a source of viruses may be banned across the network 2, as could access to e-mail attachments which are another potential source of virus propagation. Thus, when a new threat is identified by the anti-virus provider, lock down messages may be used to trigger predetermined, in accordance with user configuration and preferences, higher security level modes within connected assessment computers 24 to provide a degree of protection for the networks concerned whilst allowing the majority of their normal operations to continue.

Figure 2:
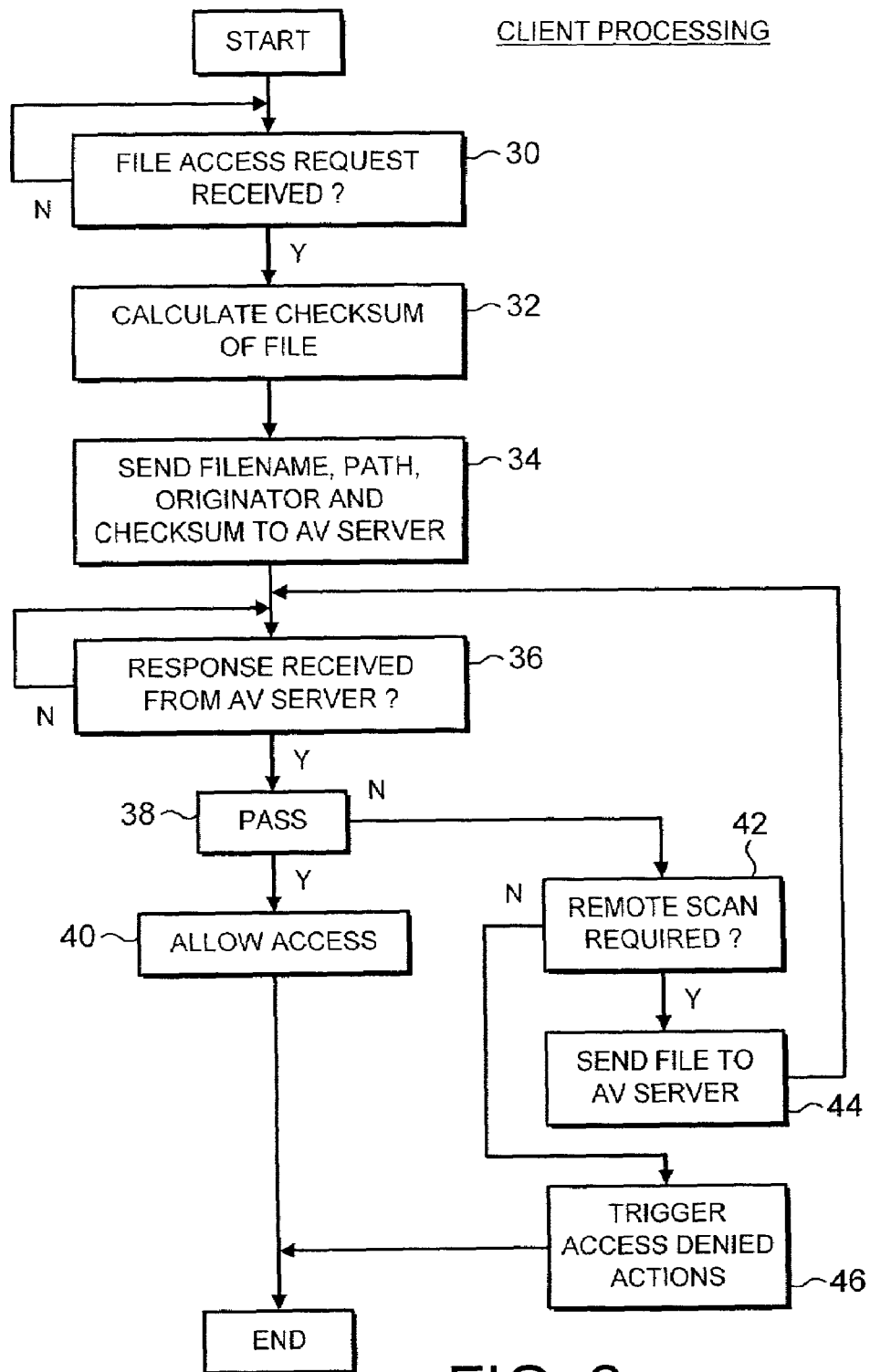
FIG. 2 is a flow diagram illustrating an example of the processing that may be performed on a client computer.

FIG. 2 is a flow diagram illustrating the processing performed by a client computer. At step 30 the computer waits to receive a file access request from a computer program executing on that client computer. At step 32 a checksum value is calculated in accordance with one of several different possible checksum algorithms, such as the MD5 algorithm. At step 34 the filename, path, originating computer name and checksum value are sent through to the assessment computer. At step 36 the client computer waits to receive a response from the assessment computer. When that response is received, step 38 serves to determine whether or not the response indicates that the computer file had passed its scanning. If the computer file had passed its scanning and access is to be permitted, then processing proceeds to step 40 at which the access is allowed.

If the response is not that the computer file had passed its scan, then processing proceeds to step 42 at which a test is made as to whether or not the response indicated that a remote scan was required. If a remote scan was required, then the computer file in question is sent to the assessment computer at step 44 and processing is returned to step 36.

If the test at step 42 does not identify a remote scan request, then since the response is neither a pass, or a remote scan request, then the computer file must be one to which access is denied and accordingly step 46 serves to trigger the denied access actions. These may include deletion, repair, quarantining or other actions upon the computer file in question as well as the generation of appropriate warning messages to a user or an administrator.

Figure 3:
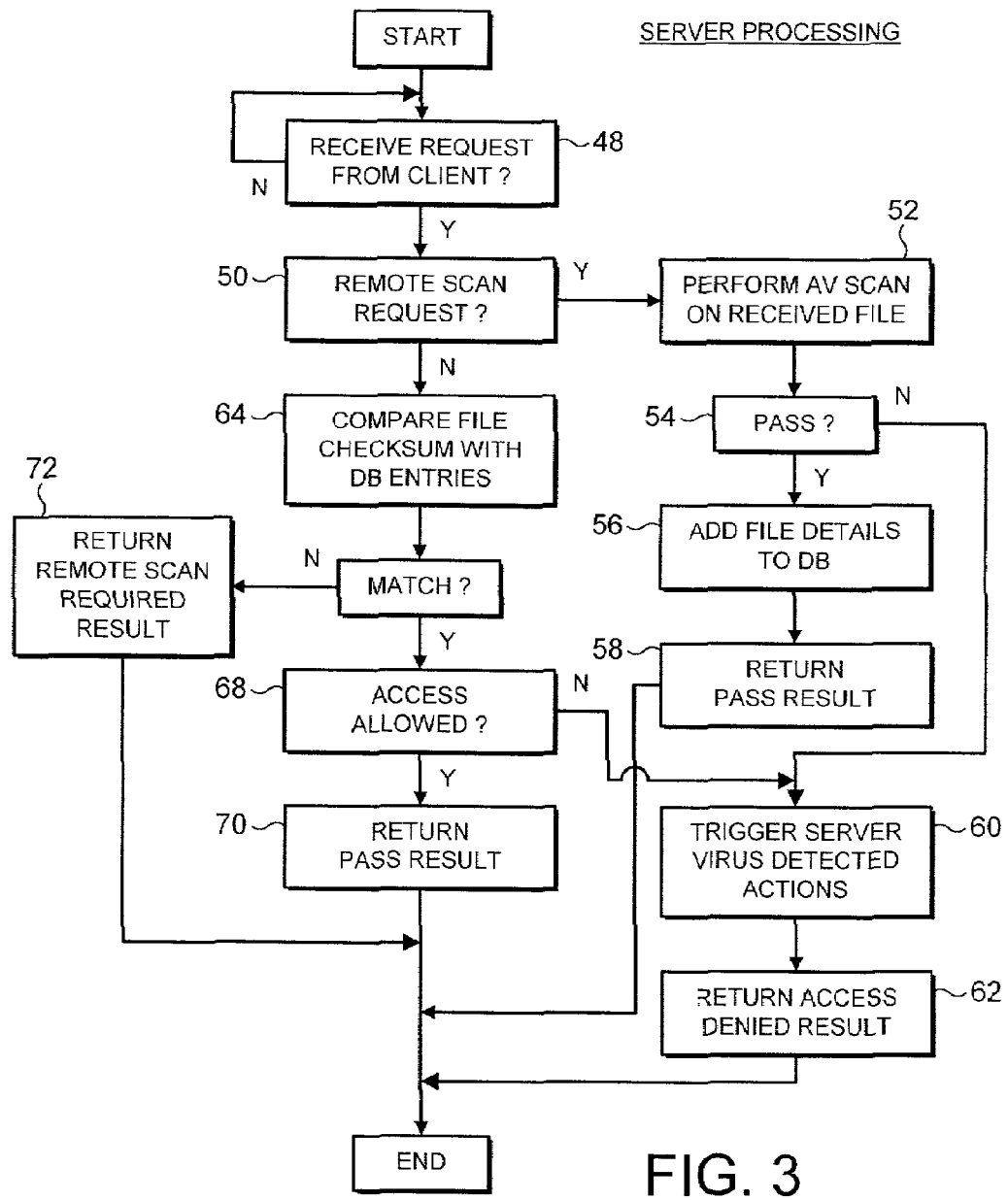
FIG. 3 is a flow diagram illustrating an example of the processing that may be performed on a server computer.

FIG. 3 illustrates the processing performed by the assessment computer. At step 48 the assessment computer waits to receive a request from a client computer. When a request is received, step 50 serves to identify whether a copy of a computer file is being returned to the assessment computer for scanning following a remote scan request that had earlier been issued by the assessment computer. If a copy of a computer file is being returned for scanning, then processing proceeds to step 52 at which the necessary malware scanning is conducted. Step 54 determines whether or not the computer file passed this malware scanning. If the computer file did pass the malware scanning, then step 56 serves to add details of that computer file to the database of scanned files held at the assessment computer relating to scans already performed. Step 58 then returns the pass result to the client computer.

If the scanning at step 52 was detected as not being passed at step 54, then processing proceeds to step 60 at which malware detected actions are triggered within the assessment computer. These malware detected actions may be similar to those previously described in relation to the client computer file. In addition, an entry specifying the malware scan fail of that computer file may also be added to the database. At step 62 an access denied result is returned to the client computer.

If the test at step 50 did not indicate that a computer file was being returned for scan, then step 64 serves to compare the file details being passed to the server with the database entries of computer files that have already been scanned. The computer file may be uniquely identified by its filename and its checksum. If at step 66 a match within the database is detected, then step 68 determines whether or not this entry indicates that access should be allowed to that computer file. If access is not to be allowed, then processing proceeds to step 60. If access is allowed, then processing proceeds to step 70 at which a pass result is returned to the client computer.

If the test at step 66 indicated that a match was not found within the database, then step 72 serves to return a remote scan required result to the client computer in order to trigger the client computer to return a copy of the computer file to the assessment computer for scanning at step 52.

Figure 4:
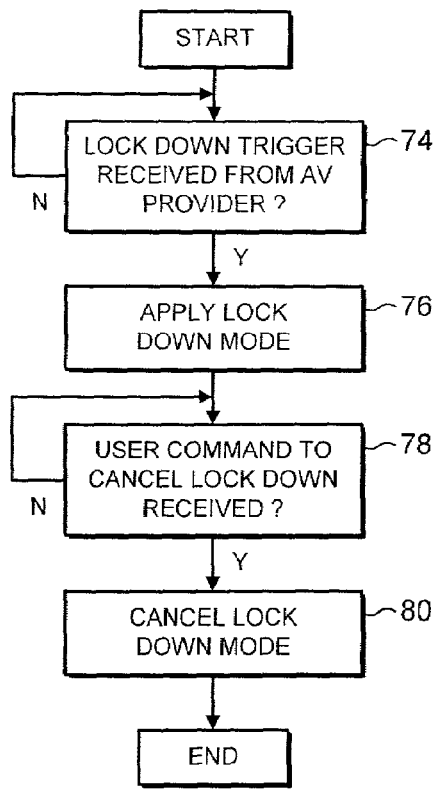
FIG. 4 is a flow diagram illustrating an example process that may be run on a server computer waiting for a lock down signal.

FIG. 4 illustrates a process that may run on the assessment computer as a background task. At step 74 the assessment computer waits to receive a lock down trigger message from the anti-virus provider. If such a message is received, then step 76 serves to activate a lock down mode in the assessment computer. The lock down mode can switch on a user predetermined set of measures intended to provide a higher degree of security, normally at the cost of at least some functionality. As an example, access to e-mail attachments or VBS files as a class may be denied. These are known to be particular vulnerabilities.

At step 78 the assessment computer waits for a user command to cancel the lock down mode. When such a command is received, then step 80 serves to cancel the lock down mode.

FIG. 5 schematically illustrates the data that may be stored for a particular computer file within the database of previously conducted scan results held by the assessment computer 24. For an individual computer file, its filename, the originating computer for which the scan of that file was first conducted, the path to the file, the checksum value for the file, an allowed access flag and a persistence flag are all stored. The allowed access flag may be used to indicate whether or not that file passed its scan result The allowed access flag may also be used as a powerful tool for switching off or on access to individual files or classes of files by an administrator. The persistence flag controls how the entry is flushed from the database on a regular interval, such as when new virus definition data is received. It will be appreciated that other fields could be added to the database relating to the particular file as required.

Figure 6:
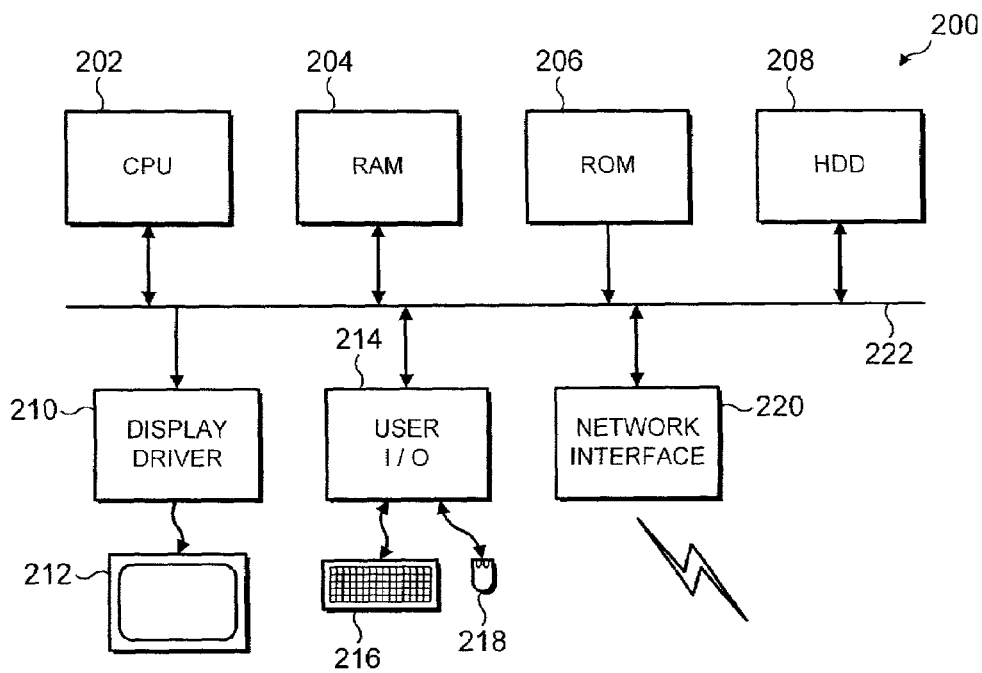
FIG. 6 is a diagram schematically illustrating the form of a general purpose computer that may be used to implement the above described techniques.

FIG. 6 schematically illustrates a general purpose computer 200 of the type that may be used to implement the above techniques. The general purpose computer 200 includes a central processing unit 202, a random access memory 204, a read only memory 206, a hard disk drive 208, a display driver 210 and display 212, a user input/output circuit 214 and keyboard 216 and mouse 218 and a network interface unit 220 all connected via a common bus 222. In operation the central processing unit 202 executes program instructions stored within the random access memory 204, the read only memory 206 or the hard disk drive 208. The working memory is provided by the random access memory 204. The program instructions could take a variety of forms depending on the precise nature of the computer 200 and the programming language being used. The results of the processing are displayed to a user upon the display 212 driven by the display driver 210. User inputs for controlling the general purpose computer 200 are received from the keyboard 216 and the mouse 218 via the user input/output circuit 214. Communication with other computers, such as exchanging e-mails, downloading files or providing internet or other network access, is achieved via the network interface unit 220.

It will be appreciated that the general purpose computer 200 operating under control of a suitable computer program may perform the above described techniques and provide apparatus for performing the various tasks described. The general purpose computer 200 also executes the method described previously. The computer program product could take the form of a recordable medium bearing the computer program, such as a floppy disk, a compact disk or other recordable medium. Alternatively, the computer program could be dynamically downloaded via the network interface unit 220.

It will be appreciated that the general purpose computer 200 is only one example of the type of computer architecture that may be employed to carry out the above described techniques. Alternative architectures are envisaged and are capable of use with the above described techniques.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product embodied on a tangible computer readable medium for controlling a computer to detect malware, said computer program product comprising:
   file access request receiving logic operable to receive at an assessment computer a file access clearance request from a requesting computer, said file access clearance request including data identifying a computer file to be accessed by said requesting computer;
   file access clearance response generating logic operable in dependence upon said data identifying said computer file to determine if said computer file has previously been assessed as not containing malware and to generate file access clearance response; and
   file access clearance response transmitting logic operable to transmit said file access clearance response to said requesting computer;
   wherein said assessment computer stores a database of computer files and said database includes for each computer file a persistence flag indicating whether an entry relating to said computer file should be purged from said database during purge operations;
   wherein said database includes for each computer file fields specifying a filename of said computer file, data identifying said requesting computer and a storage location of said computer file, and a checksum value calculated from said computer file;
   wherein said assessment computer is operable in at least a higher level security mode and a lower level security mode, said assessment computer serving to deny access to a greater range of computer files when operating in said higher level security mode compared with said lower level security mode.

2. A computer program product as claimed in claim 1, wherein said data identifying said computer file includes said checksum value calculated from said computer file.

3. A computer program product as claimed in claim 1, wherein said data identifying said computer file includes one or more of said filename of said computer file, said data identifying said requesting computer and said storage location of said computer file.

4. A computer program product as claimed in claim 1, wherein if said file access clearance response indicates a scan of said computer file is required by said assessment computer, then computer file receiving logic is operable to receive at said assessment computer said computer file from said requesting computer and performing a malware scan of said computer file.

5. A computer program product as claimed in claim 1, wherein if said file access clearance response indicates access to said computer file is denied, then triggering a denied access response in said assessment computer.

6. A computer program product as claimed in claim 5, wherein said file access clearance response indicates access to said computer file is denied if said computer file has previously been identified as containing malware, and said denied access response includes deletion of said computer file.

7. A computer program product as claimed in claim 1, wherein said database of computer files specifies whether respective computer files contain malware.

8. A computer program product as claimed in claim 7, wherein said database further includes for each computer file another field specifying an access flag indicating whether access to said computer file is denied.

9. A computer program product as claimed in claim 1, wherein said assessment computer is triggered to change from said lower level security mode to said higher level security mode by a lock down trigger message received at said assessment computer from a remote computer.

10. A computer program product as claimed in claim 1, wherein a plurality of requesting computers share access to said assessment computer for determining whether file access requests by those requesting computers should be denied.

11. A computer program product as claimed in claim 1, wherein said higher level security mode includes banning access to at least one predetermined computer file type.

12. A computer program product embodied on a tangible computer readable medium for controlling a computer to detect malware, said computer program product comprising:
   file access request detecting logic operable to detect a file access request to a computer file by a requesting computer;
   file access clearance request generating logic operable to generate a file access clearance request including data identifying said computer file;
   file access clearance request transmitting logic operable to transmit said file access clearance request from said requesting computer to an assessment computer responsible for assessment of whether said computer file contains malware;
   file access clearance request receiving logic operable to receive at said assessment computer said file access clearance request from a requesting computer; p1 file access clearance response transmitting logic operable to transmit said file data identifying said computer file to determine if said computer file has previously been assessed as not containing malware and to generate a file access clearance response;
   file access clearance response transmitting logic operable to transmit said file access clearance response to said requesting computer;
   file access clearance response receiving logic operable to receive at said requesting computer said file access clearance response from said assessment computer; and
   file access permitting logic operable if said file access clearance response indicates said computer file does not contain malware to permit said file access request by said requesting computer;
   wherein said assessment computer stores a database of computer files and said database includes for each computer file a persistence flag indicating whether an entry relating to said computer file should be purged from said database during purge operations;
   wherein said database includes for each computer file fields specifying a filename of said computer file, data identifying said requesting computer and a storage location of said computer file, and a checksum value calculated from said computer file;
   wherein said assessment computer is operable in at least a higher level security mode and a lower level security mode, said assessment computer serving to deny access to a greater range of computer files when operating in said higher level security mode compared with said lower level security mode.

13. A computer program product as claimed in claim 12, wherein said data identifying said computer file includes said checksum value calculated from said computer file.

14. A computer program product as claimed in claim 12, wherein said data identifying said computer file includes one or more of said filename of said computer file, said data identifying said requesting computer and said storage location of said computer file.

15. A computer program product as claimed in claim 12, wherein if said file access clearance response indicates a scan of said computer file is required by said assessment computer, then computer file transmitting logic is operable to transmit said computer file from said requesting computer to said assessment computer, receiving at said assessment computer said computer file from said requesting computer and performing a malware scan of said computer file.

16. A computer program product as claimed in claim 12, wherein if said file access clearance response indicates access to said computer file is denied, then triggering a denied access response in said assessment computer.

17. A computer program product as claimed in claim 12, wherein if said file access clearance response indicates access to said computer file is denied, then triggering a denied access response in said requesting computer.

18. A computer program product as claimed in claim 12, wherein said database of computer files specifies whether respective computer files contain malware.

19. A computer program product as claimed in claim 18, wherein said database further includes for each computer file another field specifying an access flag indicating whether access to said computer file is denied.

20. A computer program product as claimed in claim 12, wherein said assessment computer is triggered to change from said lower level security mode to said higher level security mode by a lock down trigger message received at said assessment computer from a remote computer.

21. A computer program product as claimed in claim 12, wherein a plurality of requesting computers share access to said assessment computer for determining whether file access requests by those requesting computers should be denied.

22. A method of detecting malware, said method comprising the steps of:
   receiving at an assessment computer a file access clearance request from a requesting computer, said file access clearance request including data identifying a computer file to be accessed by said requesting computer;
   in dependence upon said data identifying said computer file determining if said computer file has previously been assessed as not containing malware and generating a file access clearance response; and transmitting said file access clearance response to said requesting computer;

wherein said assessment computer stores a database of computer files and said database includes for each computer file a persistence flag indicating whether an entry relating to said computer file should be purged from said database during purge operations;

wherein said database includes for each computer file fields specifying a filename of said computer file, data identifying said requesting computer and a storage location of said computer file, and a checksum value calculated from said computer file;

wherein said assessment computer is operable in at least a higher level security mode and a lower level security mode, said assessment computer serving to deny access to a greater range of computer files when operating in said higher level security mode compared with said lower level security mode.

23. A method as claimed in claim 22, wherein said data identifying said computer file includes said checksum value calculated from said computer file.

24. A method as claimed in claim 22, wherein said data identifying said computer file includes one or more of said filename of said computer file, said data identifying said requesting computer and said storage location of said computer file.

25. A method as claimed in claim 22, wherein if said file access clearance response indicates a scan of said computer file is required by said assessment computer, then receiving at said assessment computer said computer file from said requesting computer and performing a malware scan of said computer file.

26. A method as claimed in claim 22, wherein if said file access clearance response indicates access to said computer file is denied, then triggering a denied access response in said assessment computer.

27. A method as claimed in claim 22, wherein said database of computer files specifies whether respective computer files contain malware.

28. A method as claimed in claim 27, wherein said database further includes for each computer file another field specifying an access flag indicating whether access to said computer file is denied.

29. A method as claimed in claim 22, wherein said assessment computer is triggered to change from said lower level security mode to said higher level security mode by a lock down trigger message received at said assessment computer from a remote computer.

30. A method as claimed in claim 22, wherein a plurality of requesting computers share access to said assessment computer for determining whether file access requests by those requesting computers should be denied.

31. A method of detecting malware, said method comprising the steps of:

detecting a file access request to a computer file by a requesting computer;

generating a file access clearance request including data identifying said computer file;

transmuting said file access clearance request from said requesting computer to an assessment computer responsible for assessment of whether said computer file contains malware;

receiving at said assessment computer said file access clearance request from a requesting computer;

in dependence upon said data identifying said computer file determining if said computer file has previously been assessed as not containing malware and generating a file access clearance response;

transmitting said file access clearance response to said requesting computer;

receiving at said requesting computer said file access clearance response from said assessment computer; and if said file access clearance response indicates said computer file does not contain malware, then permitting said file access request by said requesting computer;

wherein said assessment computer stores a database of computer files and said database includes for each computer file a persistence flag indicating whether an entry relating to said computer file should be purged from said database during purge operations;

wherein said database includes for each computer file fields specifying a filename of said computer file, data identifying said requesting computer and a storage location of said computer file, and a checksum value calculated from said computer file;

wherein said assessment computer is operable in at least a higher level security mode and a lower level security mode, said assessment computer serving to deny access to a greater range of computer files when operating in said higher level security mode compared with said lower level security mode.

32. A method as claimed in claim 31, wherein said data identifying said computer file includes said checksum value calculated from said computer file.

33. A method as claimed in claim 31, wherein said data identifying said computer file includes one or more of said filename of said computer file, said data identifying said requesting computer and said storage location of said computer file.

34. A method as claimed in claim 31, wherein if said file access clearance response indicates a scan of said computer file is required by said assessment computer, then transmuting said computer file from said requesting computer to said assessment computer, receiving at said assessment computer said computer file from said requesting computer and performing a malware scan of said computer file.

35. A method as claimed in claim 31, wherein if said file access clearance response indicates access to said computer file is denied, then triggering a denied access response in said assessment computer.

36. A method as claimed in claim 31, wherein if said file access clearance response indicates access to said computer file is denied, then triggering a denied access response in said requesting computer.

37. A method as claimed in claim 31, wherein said database of computer files specifies whether respective computer files contain malware.

38. A method as claimed, in claim 37, wherein said database further includes for each computer file another field specifying an access flag indicating whether access to said computer file is denied.

39. A method as claimed in claim 31, wherein said assessment computer is triggered to change from said lower level security mode to said higher level security mode by a lock down trigger message received at said assessment computer from a remote computer.

40. A method as claimed in claim 31, wherein a plurality of requesting computers share access to said assessment computer for determining whether file access requests by those requesting computers should be denied.

41. Apparatus for controlling a computer to detect malware, said apparatus comprising:

a file access request receiver operable to receive at an assessment computer a file access clearance request from a requesting computer, said file access clearance request including data identifying a computer file to be accessed by said requesting computer;

a file access clearance response generator operable in dependence upon said data identifying said computer file to determine if said computer file has previously been assessed as not containing malware and to generate a file access clearance response; and a file access clearance response transmitter operable to transmit said file access clearance response to said requesting computer;

wherein said assessment computer stores a database of computer files and said database includes for each computer file a persistence flag indicating whether an entry relating to said computer file should be purged from said database during purge operations;

wherein said database includes for each computer file fields specifying a filename of said computer file, data identifying said requesting computer and a storage location of said computer file, and a checksum value calculated from said computer file;

wherein said assessment computer is operable in at least a higher level security mode and a lower level security mode, said assessment computer serving to deny access to a greater range of computer files when operating in said higher level security mode compared with said lower level security mode.

42. Apparatus as claimed in claim 41, wherein said data identifying said computer file includes said checksum value calculated from said computer file.

43. Apparatus as claimed in claim 41, wherein said data identifying said computer file includes one or more of said filename of said computer file, said data identifying said requesting computer and said storage location of said computer file.

44. Apparatus as claimed in claim 41, wherein if said file access clearance response indicates a scan of said computer file is required by said assessment computer, then a computer file receiver is operable to receive at said assessment computer said computer file from said requesting computer and performing a malware scan of said computer file.

45. Apparatus as claimed in claim 41, wherein if said file access clearance response indicates access to said computer file is denied, then triggering a denied access response in said assessment computer.

46. Apparatus as claimed in claim 41, wherein said database of computer files specifies whether respective computer files contain malware.

47. Apparatus as claimed in claim 46, wherein said database further includes for each computer file another field specifying access flag indicating whether access to said computer file is denied.

48. Apparatus as claimed in claim 41, wherein said assessment computer is triggered to change from said lower level security mode to said higher level security mode by a lock down trigger message received at said assessment computer from a remote computer.

49. Apparatus as claimed in claim 41, wherein a plurality of requesting computers share access to said assessment computer for determining whether file access requests by those requesting computers should be denied.

50. Apparatus for controlling a computer to detect malware, said apparatus comprising:

a file access request detector operable to detect a file access request to a computer file by a requesting computer;

a file access clearance request generator operable to generate a file access clearance request including data identifying said computer file;

a file access clearance request transmitter operable to transmit said file access clearance request from said requesting computer to an assessment computer responsible for assessment of whether said computer file contains malware;

a file access clearance request receiver operable to receive at said assessment computer said file access clearance request from a requesting computer;

a file access clearance response generator operable in dependence upon said data identifying said computer file to determine if said computer file has previously been assessed as not containing malware and to generate a file access clearance response;

a file access clearance response transmitter operable to transmit said file access clearance response to said requesting computer;

a file access clearance response receiver operable to receive at said requesting computer said file access clearance response from said assessment computer; and a file access permission unit operable if said file access clearance response indicates said computer file does not contain malware to permit said file access request by said requesting computer;

wherein said assessment computer stores a database of computer files and said database includes for each computer file a persistence flag indicating whether an entry relating to said computer file should be purged from said database during purge operations;

wherein said database includes for each computer file fields specifying a filename of said computer file, data identifying said requesting computer and a storage location of said computer file, and a checksum value calculated from said computer file;

wherein said assessment computer is operable in at least a higher level security mode and a lower level security mode, said assessment computer serving to deny access to a greater range of computer files when operating in said higher level security mode compared with said lower level security mode.

51. Apparatus as claimed in claim 50, wherein said data identifying said computer file includes said checksum value calculated from said computer file.

52. Apparatus as claimed in claim 50, wherein said data identifying said computer file includes one or more of said filename of said computer file, said data identifying said requesting computer and said storage location of said computer file.

53. Apparatus as claimed in claim 50, wherein if said file access clearance response indicates a scan of said computer file is required by said assessment computer, then a computer file transmitter is operable to transmit said computer file from said requesting computer to said assessment computer, receiving at said assessment computer said computer file from said requesting computer and performing a malware scan of said computer file.

54. Apparatus as claimed in claim 50, wherein if said file access clearance response indicates access to said computer file is denied, then triggering a denied access response in said assessment computer.

55. Apparatus as claimed in claim 50, wherein if said file access clearance response indicates access to said computer file is denied, then triggering a denied access response in said requesting computer.

56. Apparatus as claimed in claim 50, wherein said database of computer files specifies whether respective computer files contain malware.

57. Apparatus as claimed in claim 56, wherein said database further includes for each computer file another field specifying access flag indicating whether access to said computer file is denied.

58. Apparatus as claimed in claim 50, wherein said assessment computer is triggered to change from said lower level security mode to said higher level security mode by a lock down trigger message received at said assessment computer from a remote computer.

59. Apparatus as claimed in claim 50, wherein a plurality of requesting computers share access to said assessment computer for determining whether file access requests by those requesting computers should be denied.

* * * * *